US010160862B2

(12) United States Patent
Juergens et al.

(10) Patent No.: US 10,160,862 B2
(45) Date of Patent: Dec. 25, 2018

(54) PRODUCTION OF TITANIUM DIOXIDE PIGMENT OBTAINABLE BY THE SULFATE PROCESS WITH A NARROW PARTICLE SIZE DISTRIBUTION

(71) Applicant: Kronos International, Inc., Leverkusen (DE)

(72) Inventors: Volker Juergens, Kirchhundem (DE); Siegfried Bluemel, Ratingen (DE); Achim Abdin, Nordenham (DE); Joerg Friedrich, Leichlingen (DE); Volker Schmitt, Leichlingen (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 15/410,973

(22) Filed: Jan. 20, 2017

(65) Prior Publication Data

US 2017/0210906 A1    Jul. 27, 2017

(30) Foreign Application Priority Data

Jan. 27, 2016 (EP) ..................... 16000192

(51) Int. Cl.
| | |
|---|---|
| *C09C 1/36* | (2006.01) |
| *C01G 23/053* | (2006.01) |
| *C01G 23/08* | (2006.01) |
| *C09D 11/037* | (2014.01) |
| *B02C 17/16* | (2006.01) |
| *B02C 17/20* | (2006.01) |
| *B02C 21/00* | (2006.01) |
| *C09D 7/61* | (2018.01) |

(52) U.S. Cl.
CPC ............ *C09C 1/3623* (2013.01); *B02C 17/16* (2013.01); *B02C 17/20* (2013.01); *B02C 21/007* (2013.01); *C01G 23/0532* (2013.01); *C01G 23/08* (2013.01); *C09C 1/3661* (2013.01); *C09C 1/3692* (2013.01); *C09D 7/61* (2018.01); *C09D 11/037* (2013.01); *C01P 2004/51* (2013.01); *C01P 2004/84* (2013.01)

(58) Field of Classification Search
CPC .. C09C 1/3623; C01G 23/0532; C01G 23/08; C09D 11/037; C09D 7/1216
See application file for complete search history.

(56) References Cited

U.S. PATENT DOCUMENTS

| | | | |
|---|---|---|---|
| 2,346,085 A * | 4/1944 | Sawyer ................ | C09C 1/3623 106/436 |
| 3,220,867 A | 11/1965 | O'Shaughnessy | |
| 5,407,464 A * | 4/1995 | Kaliski ................ | B02C 17/20 241/1 |
| 5,407,646 A | 4/1995 | Smith et al. | |
| 5,653,793 A * | 8/1997 | Ott ....................... | C09C 1/3623 106/436 |
| 2005/0228112 A1* | 10/2005 | Takahashi .......... | C01G 23/0532 524/497 |
| 2008/0216711 A2* | 9/2008 | Heubach ............. | B02C 17/16 106/436 |
| 2014/0261086 A1* | 9/2014 | Goparaju ............ | C09C 1/3615 106/438 |

FOREIGN PATENT DOCUMENTS

| | | |
|---|---|---|
| DE | 19536657 | 4/1997 |
| DE | 102006049495 | 9/2007 |
| DE | 102010053164 | 6/2012 |
| DE | 102011015856 | 10/2012 |

* cited by examiner

*Primary Examiner* — James A Fiorito
(74) *Attorney, Agent, or Firm* — Locke Lord LLP

(57) ABSTRACT

The invention relates to a process for producing a titanium dioxide pigment obtainable by the sulfate process with a narrow particle size distribution, the pigment itself, and the use of said pigments in coatings and printing inks.

19 Claims, No Drawings

PRODUCTION OF TITANIUM DIOXIDE PIGMENT OBTAINABLE BY THE SULFATE PROCESS WITH A NARROW PARTICLE SIZE DISTRIBUTION

RELATED APPLICATIONS

This application claims the benefit of Patent App. No. EP 16000192.1 filed Jan. 27, 2016.

BACKGROUND

Field of the Invention

The invention relates to a process for producing a titanium dioxide pigment obtainable by the sulfate process with a narrow particle size distribution, the pigment itself, and the use of said pigments in coatings and printing inks.

Technological Background of the Invention

Titanium dioxide pigment in the rutile crystal modification is usually produced by either the chloride process or the sulfate process. Rutile titanium dioxide pigment particles obtainable by the sulfate process generally have a lower hardness as compared to rutile titanium dioxide pigment particles produced by the chloride process. Therefore, the latter are more suitable for use in printing inks.

In the production by the chloride process, the raw material containing iron and titanium is reacted with chlorine, and the titanium tetrachloride formed is subsequently oxidized to titanium dioxide which is the so-called titanium dioxide base pigment. In the production by the sulfate process, the raw material containing iron and titanium is liberated in concentrated sulfuric acid in order to form titanyl sulfate. The titanyl sulfate is hydrolyzed and calcined in a rotary kiln to form titanium dioxide, the titanium dioxide base pigment. The titanium dioxide base pigment largely consists of agglomerates of primary particles, which must be deagglomerated as much as possible before further processing. The titanium dioxide base pigment obtained by the sulfate process usually has a broader particle size distribution in comparison to the titanium dioxide base pigment obtainable by the chloride process. For the deagglomeration, the titanium dioxide base pigment particles are subsequently slurried to form a suspension, and subjected to wet milling, for example, in an agitator ball mill. Subsequently, the particles are subjected to an inorganic and/or organic aftertreatment depending on the field of application.

For the general use in printing inks and coatings, in particular optical properties, such as opacity and gloss, are of a critical importance. Said properties are essentially determined by the broadness of the particle size distribution. Too fine fractions in the particle size distribution adversely affect opacity, whereas coarse particles reduce the gloss. Thus, a particle size distribution being as narrow as possible, as well as an optimized particle size are desired. The mean particle size and the broadness of the particle size distribution can be influenced by the type of wet milling. Usually, wet milling is performed by conveying the particle suspension through the agitator ball mill in one passage, which produced a relatively broad particle size distribution. In addition, however, it is known that multiple conveying through the agitator ball mill either in a cycle, the so-called circuit grinding, or in the form of several batches, the so-called multi-passage grinding, results in a narrower particle size distribution.

BRIEF DESCRIPTION OF THE INVENTION

It is the problem of the invention to provide a process by which titanium dioxide particles derived from the sulfate process can be provided with a narrow particle size distribution and a particular suitability for use in coatings and, in particular, in printing inks.

The problem is solved by a process for producing a titanium dioxide pigment, in which titanium dioxide particles obtained by the sulfate process are ground in an aqueous suspension before aftertreatment, characterized in, that the wet milling is performed as a passage milling in a cascade of at least three agitator ball mills and that the grinding media of the first agitator ball mill have a larger diameter and/or a higher density than that of the grinding media of the second or subsequent agitator ball mill.

Therefore, in a first aspect, the present invention relates to a process for producing a titanium dioxide pigment, in which titanium dioxide particles obtained by the sulfate process are ground in an aqueous suspension prior to aftertreatment, characterized in, that the wet milling is conducted as a passage milling in a cascade of at least three agitator ball mills and that the grinding media of the first agitator ball mill have a larger diameter and/or a higher density than that of the grinding media of the second or subsequent agitator ball mill.

In another aspect the present invention relates to a titanium dioxide pigment obtainable by the process disclosed herein.

Finally, in a further aspect, the present invention refers to the use of a titanium dioxide pigment described herein in coatings and printing inks.

Further advantageous embodiments of the invention are contained in the dependent claims.

DESCRIPTION OF THE INVENTION

These and further aspects, features and advantages of the invention become apparent to the skilled person from a study of the following detailed description and claims. Each feature from one aspect of the invention may also be used in any other aspect of the invention. Numerical ranges stated in the form "from x to y" as well as numerical values include the values mentioned and those values that lie within the range of the respective measurement accuracy as known to the skilled person. If several preferred numerical ranges are stated in this form, of course, all the ranges formed by a combination of the different end points are also included. The term "about" with respect to numerical values and/or ranges is intended to capture the full range of measuring accuracy and uncertainty ranges of standard commercial tests.

According to experience, during the wet milling of a suspension of titanium dioxide particles in an agitator ball mill (hereinafter also referred to as a sand mill), the particle agglomerates are largely deagglomerated, and the primary particles are further comminuted to a certain extent. There is a difference between titanium dioxide particles obtained by the sulfate process and titanium dioxide particles obtained by the chloride process, the former particles being more readily comminuted. In the following, the processing in an agitator ball mill is referred to as "milling" or "wet milling".

The present invention proceeds from the experience that multi-passage grinding provides a narrower dwelling time distribution for the particles and thus a narrower particle size distribution as compared to circuit grinding in an agitator ball mill. The invention is further based on the recognition that the kinetic energy of the grinding media acting on the particles during the milling is a function of the size of the grinding media and of the density of the grinding media. At the same time, the comminuting progress is a function of the number of grinding media/particle contacts, which increases as the size of the grinding media is reduced.

According to a preferred embodiment of the invention, a suspension of unground titanium dioxide particles obtained by a sulfate process is subjected, in the first passage, to wet milling in an agitator ball mill with grinding media having a larger diameter and/or a higher density as compared to the grinding media employed in the second or subsequent passages. In this way, the grinding media in the agitator mill of the second and one or more subsequent passages are adapted to the comminuting progress and the consequently decreasing viscosity of the particle suspension, and thus optimization of the input amount of energy is achieved. At the same time, excess grinding of the particles and the production of an undesirable fine fraction (<0.2 µm) are minimized.

The multi-passage milling offers the opportunity to employ either horizontally or vertically mounted mills. Horizontally mounted closed agitator ball mills can also be operated at an increased viscosity of the suspension with relatively high throughput volumes, for example, with 15 to 18 m$^3$/h, in contrast to vertically mounted open mills. In contrast, vertical open mills can usually be operated only at a throughput of up to about 8 m$^3$/h.

According to a preferred embodiment, a suspension of titanium dioxide base pigment particles derived from the sulfate process that have not yet been aftertreated is employed. In the unground state, the particle suspension has a higher fraction of agglomerates and a higher viscosity.

In a particular embodiment of the invention, a titanium dioxide base pigment is employed that has an SC value of <4.5 before the wet milling according to the invention. According to the invention, an "SC value" designates the negative b* value measured according to DIN 53165 as a blue cast of a paint composition consisting of titanium dioxide and black paste (so-called MAB test). Usually, the SC value for titanium dioxide base pigments obtained by a sulfate process is >4.5, preferably from 5 to 7. The lower SC value of <4.5 is associated with an increased hardness of the particles and an increased particle size. An SC value of <4.5 can be achieved in the sulfate process, for example, by longer calcination times or higher calcination temperatures.

The grinding media employed in the first step or passage are larger and/or have a higher density than those used in the second and subsequent passages. Preferably, the grinding media are larger and have a higher density than those used in the subsequent passages. For example, ceramic grinding media, such as grinding media of aluminum oxide, zirconium silicate or zirconium oxide, are employed in the first passage in the agitator ball mill. Preferably, the grinding media have a diameter within the range of from about 0.6 to about 1.2 mm. The grinding of the first passage can also be referred to as pre-grinding.

In a preferred embodiment of the invention, the grinding of the first passage is performed in a closed and optionally horizontally mounted agitator ball mill (hereinafter also referred to as a sand mill). Preferably, a usual dispersant, especially hexametaphosphate, is additionally added to the suspension. Usual dispersants are known in the art.

In a second step (second passage) as well as a third and any subsequent steps, preferably subsequent to the first step (first passage), grinding media having a smaller size and/or lower density as compared to the first step are employed. For example, sand has a lower density as compared to ceramic grinding media. In particular, Ottawa sand is suitable, for example, with a diameter of from about 0.6 to about 0.8 mm, or from about 0.4 to about 0.6 mm. Additional steps or passages can be employed as desired.

The second, third and further passage grinding can take place in a horizontal or vertical sand mill. When Ottawa sand is employed, the vertically mounted sand mill is preferred, because there is increased sand breakage in the horizontally mounted mill, and the discharge system of the sand mill will clog.

A vertically mounted sand mill for the second passage can have an open construction. According to the invention, the third passage grinding may also be performed in a vertical sand mill.

In a preferred embodiment of the invention, the grinding is performed under such conditions that the first agitator ball mill is filled with zirconium silicate or zirconium oxide beads of a size of about 0.6 to about 0.8 mm, the second agitator ball mill is filled with Ottawa sand of a size of 0.6 to 0.8 mm, and the third agitator ball mill is filled with Ottawa sand of a size of about 0.4 to about 0.6 mm.

The procedure according to the invention enables large throughput volumes in each of the preferred three grinding passages, so that the dwelling time within the mills is shortened, and thus excess grinding of the particles is prevented. Preferably, the process according to the invention is performed under such conditions that the throughput in the first passage per hour is more than 15-fold, especially more than 20-fold and more preferably about 30- to 35-fold, the mill volume.

Moreover, further dispersant can be added between the grinding passages. Further, NaOH can be used to adjust an optimum pH and thus an optimum viscosity of from 50 to 500 mPas, preferably from 100 to 200 mPas.

Subsequently to the wet milling, the titanium dioxide pigment particles are subjected to well established inorganic and/or organic aftertreatment. Inorganic aftertreatment usually includes coating with inorganic oxides or water-containing oxides, such as $SiO_2$, $Al_2O_3$, $ZrO_2$, etc. These may be compact or rather loose coatings. In a particular embodiment, the pigment particles are treated with aluminum oxide, preferably in a multistage process. The skilled person is familiar with the aftertreatment processes used in $TiO_2$ process technology.

Finally, the aftertreated $TiO_2$ pigment particles are usually micronized in a steam jet mill. In the meantime, a hydrophilic organic compound, such as 1,1,1-trimethylolpropane (TMP), may optionally be added as a grinding aid to the steam jet mill. Further known suitable organic additives can also be used. The amount of added grinding aid, calculated as carbon, should preferably be within a range of from about 0.05 to about 0.50% by weight, preferably from about 0.18 to about 0.35% by weight, carbon, based on $TiO_2$.

In another embodiment of the invention, the titanium dioxide particles are subjected to dry milling, preferably in a pendulum mill or high compression roller mill, before the wet milling. The dry milling enables the cracking of hard particle agglomerates that cannot be deagglomerated during the wet milling in the agitator ball mill. During the dry milling, a grinding aid, such as 1,1,1-trimethylolpropane (TMP) or trimethylolethane (TME) or related substances, may be added. The preferred amount is around about 0.03 to about 0.3% by weight, especially from about 0.04 to about 0.1% by weight, calculated as carbon and based on $TiO_2$.

The process according to the invention enables the production of titanium dioxide pigment that is suitable, in particular, for coatings in general and especially for printing inks.

What is being claimed is:

1. A process for producing a titanium dioxide pigment comprising:
    providing titanium dioxide particles produced by the sulfate process;
    creating an aqueous suspension of the titanium dioxide particles;
    wet milling the titanium dioxide particles in the suspension prior to any aftertreatment of the particles;
    wherein the wet milling is conducted as passage milling in a cascade of at least three agitator ball mills, each agitator ball mill contains a grinding media having a diameter and a density;
    wherein the density of the grinding media in the first agitator ball mill is larger than the density of the grinding media in each of the subsequent agitator ball mills and the diameter of the grinding media in the first and second agitator ball mills is each larger than the diameter of the grinding media in each of the agitator ball mills subsequent to the second agitator ball mill.

2. The process of claim 1, wherein the first agitator ball mill is operated at a throughput of more than 15 times the mill volume per hour.

3. The process of claim 2, wherein the first agitator ball mill is operated at a throughput of more than 20 times the mill volume per hour.

4. The process of claim 1, wherein at the first agitator ball mill is mounted horizontally and at least one of the subsequent agitator ball mills is mounted vertically.

5. The process of claim 4, wherein the second and third of the at least three agitator ball mills are mounted vertically.

6. The process of claim 1, wherein the grinding media of the first agitator ball mill is a ceramic grinding media having a diameter from about 0.6 mm to about 1.2 mm.

7. The process of claim 1, wherein the grinding media of the first agitator ball mill is zirconium silicate beads having a diameter of from about 0.6 to about 0.8 mm, the grinding media of the second agitator ball mill is Ottawa sand having a diameter of from about 0.6 to about 0.8 mm and the grinding media in the third agitator ball mill is Ottawa sand having a diameter of from about 0.4 to about 0.6 mm.

8. The process of claim 1 further comprising adding hexametaphosphate as a dispersant during the wet milling.

9. The process of claim 1 wherein the titanium dioxide particles have an SC value as determined by the MAB test of less than 4.5 before the wet milling.

10. The process of claim 1 further comprising dry milling the titanium dioxide particles in a pendulum mill or high compression roller mill before the wet milling.

11. The process of claim 10 further comprising adding 1,1,1-trimethylolpropane (TMP) as a grinding aid in the dry milling.

12. The process of claim 11, wherein from about 0.03 to about 0.3 weight percent of TMP, calculated as carbon and based on $TiO_2$, is added in the dry milling.

13. The process of claim 1 further comprising aftertreating the titanium dioxide particles with aluminum oxide.

14. The process of claim 1, further comprising adding 1,1,1-trimethylolpropane (TMP) to the wet milled titanium dioxide particles and micronizing the particles in a steam jet mill.

15. The process of claim 1, wherein both the diameter and density of the grinding media in the first agitator ball mill is larger than the diameter and density of the grinding media in each of the subsequent agitator ball mills.

16. The process of claim 1 wherein:
    wherein the titanium dioxide particles have an SC value as determined by the MAB test of less than 4.5 before the wet milling; and
    the first agitator ball mill is mounted horizontally and is operated at a throughput of more than 15 times the mill volume per hour.

17. The process of claim 16, wherein the grinding media of the first agitator ball mill is a ceramic grinding media having a diameter from about 0.6 to about 1.2 mm.

18. The process of claim 16, wherein the grinding media of the first agitator ball mill is zirconium silicate beads having a diameter of from about 0.6 to about 0.8 mm, the grinding media of the second agitator ball mill is Ottawa sand having a diameter of from about 0.6 to about 0.8 mm and the grinding media in the third agitator ball mill is Ottawa sand having a diameter of from about 0.4 to about 0.6 mm.

19. The method of claim 16, further comprising dry milling the titanium dioxide particles in a pendulum mill or high compression roller mill before the wet milling.

* * * * *